United States Patent

Hubele et al.

[15] 3,676,457

[45] July 11, 1972

[54] N-[3-TRIFLUOROMETHYL-4-CHLOROPHENYL]-CARBAMATES

[72] Inventors: Adolf Hubele, Riehen; Otto Rohr, Therwil, both of Switzerland

[73] Assignee: Ciba-Geigy Corporation

[22] Filed: Feb. 4, 1969

[21] Appl. No.: 796,571

[30] Foreign Application Priority Data

Feb. 6, 1968 Switzerland .......................... 1765/68

[52] U.S. Cl. ........................... 260/471, 260/347.4, 260/295, 424/285, 424/300, 424/263, 252/106, 252/107
[51] Int. Cl. ......................................................... C07c 101/00
[58] Field of Search .................................................. 260/471

[56] References Cited

UNITED STATES PATENTS 3,308,018   3/1967   Gier ...................................... 260/471

Primary Examiner—Alex Mazel
Assistant Examiner—Bernard Dentz
Attorney—Harry Goldsmith, Joseph G. Kolodny, Bryant W. Brennan and Edward J. Sites

[57] ABSTRACT

The invention relates to compounds of the general formula

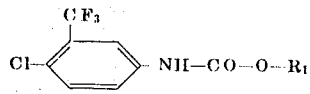

wherein $R_1$ represents an aralkyl or aralkenyl residue or a phenyl radical having four or five substituents or a five- to six-membered heterocycle which may be bound over an alkyl residue. The compounds are used for combating various types of pests, preferably bacteria and fungi.

6 Claims, No Drawings

N-[3-TRIFLUOROMETHYL-4-CHLOROPHENYL]-CARBAMATES

The present invention provides pesticidal preparations, especially preparations of combating bacteria and fungi, which comprise, as active component, a compound of the formula

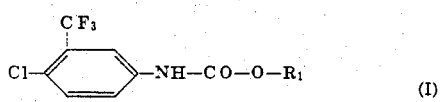

in which $R_1$ represents an aralkyl or aralkenyl radical or a phenyl radical having four or five substituents selected from halogen, an alkyl, alkoxy and/or nitro group, or a five- to six-membered heterocyclic radical that may be optionally bound over an alkyl radical. The preparation may contain one or more of the following additives: a solvent, a diluent, a dispersant, a wetting agent, an adhesive as well as other known pesticides.

In a narrower sense, compounds of Formula I are used as active substances in which $R_1$ represents a benzyl radical optionally substituted by halogen and/or $-NO_2$ or a phenyl radical having four or five substituents selected from halogen, an alkyl, alkoxy and/or nitro group or a five- or six- membered heterocyclic radical that is bound over an alkyl radical.

As examples of especially active groups for combating bacteria and fungi those of Compound II may be mentioned:

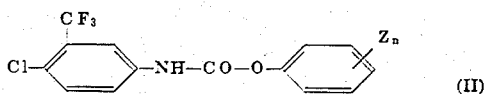

in which $n = 4$ or 5 and Z represents the substituents $-CH_3$, $-OCH_3$, $-Cl$, $-Br$, $-NO_2$ which may be the same or different from one another.

Among these, the compounds of the formulas

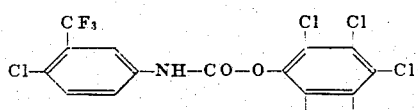

and

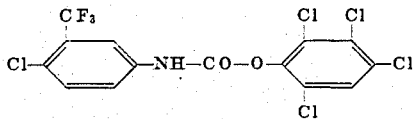

are particularly effective active substances in combating lower organisms.

To the particularly effective type of compound there moreover belong those of the Formula (III)

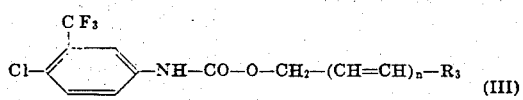

in which $n = 0$ or 1 and $R_3$ represents an aromatic radical.

The active substances of Formula (I) have an outstanding effectiveness against plant-pathogenic bacteria and fungi, e.g. *Piricularia oryzae* ("rice blast"). In addition to these properties they have a considerable effect against insects, for example soil insects or storage pests, against gastropodes, nematodes, particularly plant nematodes, such as *Panagrellus redivivus*, and can be used in certain concentrations against undesirable plants. They also show an activity against human and animal pathogenic helminths, for example trematodes and cestodes, as well as against arachnoids (spiders, mites, ticks etc.).

The compounds of Formula (I) may be prepared by the methods known for the preparation of carbamates by reacting araliphatic or heterocyclic hydroxyl compounds or phenols of the formula $HO-R_1$ a. with para-chloro-meta-trifluoromethylphenyl isocyanate in substance, in protected form (as adduct with $NaHSO_3$) or in situ, b. or with para-chloro-meta-trifluoromethylphenyl carbamic acid halide obtained by reacting para-chloro-meta-trifluoroaniline and haloformic acid ester.

The active substances of the present invention have antimicrobic, particularly antibacterial properties, for example against Gram-positive organisms, such as *Staph. aureus* as well as against acid-resistant bacteria, such as *M. tuberculosis*.

In aqueous dispersion they have an affinity for keratin fibers and protect the treated material from destruction by larvae of small butterflies (moths) and certain kinds of coleoptera (for example larvae of Attagenus or Anthrenus). The carbamates of Formula (I) are suitable for disinfection purposes and for the disinfecting cleaning of articles, for example of cellulose-containing material. Such compounds can be processed to textile detergents and toilet soaps.

It is particularly advantageous that the compounds of Formula (I) do not show any toxic side-effects towards warm-blooded animals in the concentrations required for disinfection. This makes it possible to use the new compounds for combating harmful organisms on a broad basis, for example for the protection of timber, for preserving various industrial products, for protecting fibrous materials against harmful microorganisms, for preserving agricultural products, as disinfectants in veterinary medicine, in general hygiene and body care.

It is of particular importance that the compounds of the invention do not lose their bactericidal and fungicidal activity in the presence of albuminous substances and soaps. The new compounds do not have an objectionable odor of their own and are well tolerated, at least by healthy skin.

Among the industrial products which may be preserved and/or disinfected with the help of the disinfectants according to the invention, the following may be selected as examples: textile assistants or finishing agents, glues, binders, paints, thickeners, dyeing or printing pastes and similar preparations based on organic and inorganic dyestuffs or pigments, including those which contain casein or other organic compounds as admixtures. Wall and ceiling paints, for example those containing an albuminous color binder, are also protected against attack by pests by adding the new compounds.

Furthermore, the new compounds may be used for the protection of fibers and textiles by being absorbed on natural or synthetic fibers and there developing a durable action against harmful organisms, for example fungi, bacteria and insects. The compounds may be added before, simultaneously, or after treatment of these textiles with other substances, for example dyeing or printing pastes, finishing agents and the like. These compounds are in special measure able to protect wool fibers against moths and other ingestion pests. They show, for example, an excellent activity against moth larvae when applied to the fiber from an acetone solution or after absorption on the fiber from an aqueous bath in the presence of an emulsifier.

The compounds of Formula (I) may also be used as preservatives in the cellulose and paper industry, inter alia for preventing the known slime formation caused by microorganisms in the apparatus used for the production of paper.

Depending on the nature of the additives with which the new active substances are combined in the agents according to the invention, preparations are obtained which are especially suitable for cleaning, disinfection or body care.

Thus, for example, detergents and cleansing agents having an excellent antibacterial or antimycotic effect are obtained by combining the compounds according to the invention with detergents and/or surface-active substances. The compounds of the Formula (I) may, for example, by incorporated into soaps or be combined with soap-free detergents and/or surface-active substances, or they may be combined with mixtures of soaps and soap-free detergents.

The invention relates therefore also to the use of detergents and cleansing agents which contain as active component a compound of Formula (I), and also to making textile and non-textile materials bacteria-resistant.

In most cases textile materials of synthetic or natural origin are protected against infestation by bacteria by a content of 0.1 to 3 percent of active substance. The active substance may be used together with other textile assistants, such as finishing agents, anti-creasing dressings etc.

The preparations of the invention that contain the compounds of Formula (I) may also be employed as cleansing agents in industry or in the household, as well as in the food industry, e.g. dairies, breweries abattoirs, in agriculture and in veterinary hygiene.

In general, the application forms correspond to the ordinary formulations of pesticides; for example preparations that contain the compounds of Formula (I) may also contain additives such as carriers, solvents, diluents, dispersants, wetting agents or adhesives as well as other pesticides.

The following Examples illustrate the invention.

Example 1

75 Parts by weight of pentachlorphenol in 300 parts by volume of acetonitrile and 67 parts by weight of p-chloro-m-trifluoromethylphenyl isocyanate in 100 parts by volume of acetonitrile are mixed at 50° C and 0.1 part of triethylenediamine is added. The reaction mixture is allowed to stand for 3 hours at room temperature, then cooled and the product obtained is filtered off.

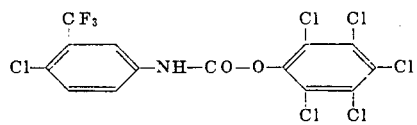

Compound No. 1

Melting point: 162° – 164° C (from toluene).

In an analogous manner the following compounds of the type

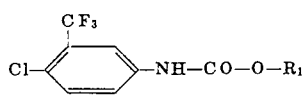

may be prepared:

| Compound No. | $R_1$ | Melting point, °C |
|---|---|---|
| 1 | 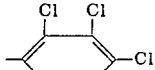 | 162–164 |
| 2 |  | 143–145 |
| 3 | 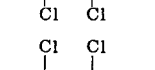 | 151–153 |
| 4 | 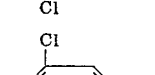 | 151–153 |
| 5 | 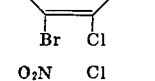 | 167–169 |
| 6 | 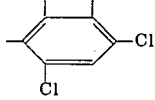 | 150–152 |
| 7 | Br Br / Br / Br CH₃ | 167–168 |
| 8 | —CH₂—C₆H₅ | 90–91.5 |
| 9 | —CH₂—(Cl,Cl-phenyl) | 79.5–81 |
| 10 | —CH₂—(NO₂-phenyl) | 172–173 |
| 11 | —CH₂—(NO₂-phenyl) | 173.5–175 |
| 12 | —CH₂—CH(CH₂—CH₂)(CH₂)O | 113–115 |
| 13 | —CH₂-pyridyl | 162.5–163.5 |
| 14 | —CH₂-pyridyl-N-oxide | 208–209.5 [1] |
| 15 | H (cyclohexyl) | 95–96 |
| 16 | —CH₂-furyl | 82–84 |
| 17 | —CH₂—CH=CH—phenyl | Oil |

[1] Decomp.

EXAMPLE 2

In a greenhouse *cucurbita pepo L.* plants were grown and sprayed once prophylactically with an aqueous broth of the test-product containing 0.1 percent of active substance of the compound 3. Two days after treatment the plants were infected with spores of *Erysiphe cichoriacearum DC* and after 12 to 14 days inspected as to infestation with fungi. In comparison with the untreated control (0 percent effect) the effect on the sprayed plants was 100 percent without phytotoxicity.

EXAMPLE 3

The new carbamates of the Formula (I) show a pronounced, strong effect against Gram-positive bacteria, particularly against Staphylococci and Streptococci. They are also effective against pathogenic fungi, for example *Trichophyton interdigitale*.

The antibacterial activity in the dilution test was determined as follows:

Bacteriostasis and bacteriocidal activity 20 mg of active substance were dissolved in 10 ml of propylene-glycol; 0.25 ml of this solution was added to 4.75 ml of sterile glucose bouillon and then further diluted in test-tubes in a ratio of 1:10. These solutions were then inoculated with *Staphylococcus aureus* and incubated for 48 hours at 37° C. (Bacteriostasis). After 24 hours test-time one loop from these cultures was spread on to glucose agar plates and incubated for 24 hours at 37° C. (Bacteriocidal activity). After the times mentioned the following limit-concentrations were determined in ppm of the bacteriostasis and bacteriocidal activity, respectively:

| Compound | Staph. aureus | Esch. coli |
|---|---|---|
| | Bacterio-static/cidal | Bacterio-static/cidal |
| 1 | 0,3 / 0,3 | >100 / >100 |
| 3 | 0,03 / 0,03 | 100 / 100 |
| 4 | 0,3 / 0,3 | >100 / >100 |
| 5 | 1 / ≈1 | >100 / >100 |
| 15 | 1 / 1 | >100 / >100 |

EXAMPLE 4

In order to test the antimycotic effect a solution of 1 percent strength of an active compound in propylene-glycol was prepared and diluted with a 10 percent beer-wort solution in concentrations of 250, 100, 50, 30, 10, 3, 1 and 0.5 ppm. The determination of the fungistatic limit concentration gave the following values in ppm:

| Compound No. | Aspergillus niger | Rhizopus nigricans |
|---|---|---|
| 1 | 10 | 1 |
| 3 | <10 | 10 |
| 4 | 100 | 30 |
| 5 | 100 | 100 |
| 15 | >100 | ≈10 |
| 16 | 100 | 10 |

EXAMPLE 5

In order to test the effect on gastropodes the following aqueous dilution series of an active substance concentration was prepared: 25, 12, 6, 4, 3, 2 and 1 ppm. Batches of five snails each (*Australorbis glabratus*) having a shell diameter of 15 mm were put into each of these solutions for 24 hours at 20° – 22° C. They were then taken out and put for a further 48 hours in clear water with the addition of food. After this recuperation time the lethal rate was determined. For Compound 1 the lethal rate was 100 percent in a concentration of 1.5 ppm.

EXAMPLE 6

In order to test the insecticidal effect young Phaseolus plants were dipped into aqueous active substance solutions containing 0.2, 0.1, 0.08, 0.04 and 0.02 percent of active substance, allowed to dry and infested with 5 larvae each of *Orgyia gonostigma* in the L–3 stage or five larvae each of *Epilachna varivestis* in the L–4 stage; the whole of each of the plants then being covered with a plastic bag. The following results were obtained:

Mortalities with a concentration of 0.08% active substance

| Compound No. | Larvae | Time | Mortality |
|---|---|---|---|
| 15 | Orgyia | 5 days | 80% |
| 17 | Orgyia | 5 days | 100% |
| | Epilachna | 5 days | 80% |

EXAMPLE 7

Compound No. 16 is distinguished by its effect *against Piricularia oryzae Bri. et Cav.*, the causative agent of rice blast disease.

Rice plants were grown in a greenhouse and infected with an aqueous conidia suspension of the test fungus. The plants were incubated in a humid chamber and on the day after infection sprayed with an aqueous broth containing 0.1 percent of active substance.

After a week the treated plants showed an infestation of only 5 percent as compared with a 100 percent infestation of the control plants.

FORMULATION EXAMPLES

Dusting Preparations

Equal parts of an active substance according to the invention and precipitated silicic acid are finely ground. By mixing with kaolin or talcum, dusting preparations can be prepared containing preferably 1–6 percent of active substance.

Spraying powders

For the preparation of a spraying powder the following components are, for example, mixed and finely ground:

50 parts of active substance according to the present invention 20 parts of Hisil (highly adsorbant silicic acid)

25 parts of Bolus alba (kaolin)

3.5 parts of the reaction product from para-tertiary octylphenol and ethyleneoxide 1.5 parts of (sodium 1-benzyl-2-stearyl-benzimidazole-6,3'-disulphonate)

Emulsion concentrates

Readily soluble active substances may also be formulated as emulsion concentrates according to the following prescriptions:

20 parts of active substance 70 parts of xylene 10 parts of a mixture from a reaction product of an alkylphenol with ethyleneoxide and calcium dodecylbenzene sulphonate are mixed. On being diluted with water to the desired concentration a sprayable emulsion is formed.

I claim:

1. A compound of the formula

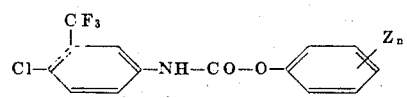

wherein *n* is an integer of 4 or 5 and Z represents substituents which may be the same or different from one another and which are selected from the group consisting of methyl, methoxy, chlorine, bromine and nitro, at least three of said substituents being selected from the group consisting of chlorine and bromine.

2. The compound as claimed in claim 1 of the formula

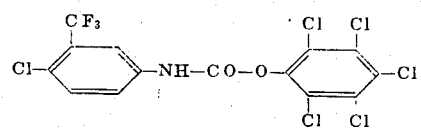

3. The compound as claimed in claim 1 of the formula

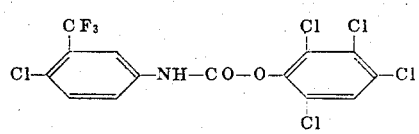

4. The compound as claimed in claim 1 of the formula
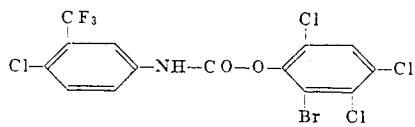
5. The compound as claimed in claim 1 of the formula
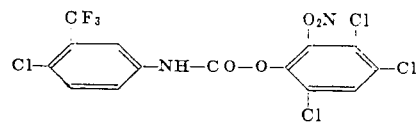
6. The compound as claimed in claim 1 of the formula
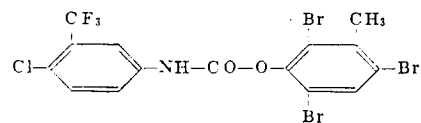
* * * * *

UNITED STATES PATENT OFFICE
CERTIFICATE OF CORRECTION

Patent No. 3,676,457                          Dated July 11, 1972

Inventor(s)  Adolf Hubele and Otto Rohr

It is certified that error appears in the above-identified patent and that said Letters Patent are hereby corrected as shown below:

On the cover page, entry [73] should read

-- Assignee: Ciba-Geigy AG, Basle, Switzerland --

Signed and sealed this 27th day of November 1973.

(SEAL)
Attest:

EDWARD M. FLETCHER, JR.          RENE D. TEGTMEYER
Attesting Officer                Acting Commissioner of Patents